United States Patent
Orr et al.

(10) Patent No.: US 8,035,939 B2
(45) Date of Patent: Oct. 11, 2011

(54) TRACKING AND FAULT COMMUNICATION FOR DC POWER SUPPLY MODULES

(75) Inventors: Raymond Kenneth Orr, Kanata (CA); Robert Gerald Hilkes, Ottawa (CA)

(73) Assignee: Power Integrations, Inc., San Jose, CA (US)

( * ) Notice: Subject to any disclaimer, the term of this patent is extended or adjusted under 35 U.S.C. 154(b) by 235 days.

(21) Appl. No.: 11/296,458

(22) Filed: Dec. 8, 2005

(65) Prior Publication Data

US 2007/0133139 A1    Jun. 14, 2007

(51) Int. Cl.
*H02H 3/20*      (2006.01)
*G05F 1/10*      (2006.01)
(52) U.S. Cl. ........................ 361/91.1; 323/234
(58) Field of Classification Search ................. 361/91.1; 323/234
See application file for complete search history.

(56) References Cited

U.S. PATENT DOCUMENTS

| | | | | |
|---|---|---|---|---|
| 6,049,242 | A | * | 4/2000 | Lutley et al. ................. 327/333 |
| 2004/0150928 | A1 | * | 8/2004 | Goodfellow et al. ........... 361/90 |
| 2006/0075270 | A1 | * | 4/2006 | Seo ............................... 713/320 |

OTHER PUBLICATIONS

"New Power Modules Include Supply Voltage Sequencing and Margin Test Capabilities"; Chris Thornton; Texas Instruments; Sep. 1, 2003; [online]; <URL: http:/www.eeproductcenter.com/showArticle.jhtml?articleID-14200170>.
"15-A, 5-V Input Non-Isolated Wide-Output Adjust Power Module"; ATH15T05 Series—5-V Input; Astec; Revision 00 (Dec. 3, 2003); pp. 1-14.
"Power Supply Sequencing—A New Approach"; Mark O'Sullivan; Artesyn Technologies; Nov. 1, 2004; pp. 1-4.
20-A, 18-60-V Input Auto-Track Compatible Isolated DC/DC Converter; PTB78520W; Texas Instruments; SLTS226 Jul. 2004; pp. 1-13.

* cited by examiner

*Primary Examiner* — Rexford Barnie
*Assistant Examiner* — Nicholas Ieva
(74) *Attorney, Agent, or Firm* — Blakely Sokoloff Taylor & Zafman LLP

(57) ABSTRACT

A plurality of DC power supply modules have track pins interconnected for tracking of output voltages of the modules during power-up and normal power-down. Each module pulls down its track pin voltage in response to any fault, and detects a track pin voltage below a threshold to detect a fault communicated from any other module, to facilitate fault power-down. The track pin voltage is initially raised above the threshold for power-up. One module can be designated a master for monitoring an input voltage to the modules and for determining the track pin voltage for normal power-up and power-down.

20 Claims, 2 Drawing Sheets

TRACKING AND FAULT COMMUNICATION FOR DC POWER SUPPLY MODULES

Figure 1:
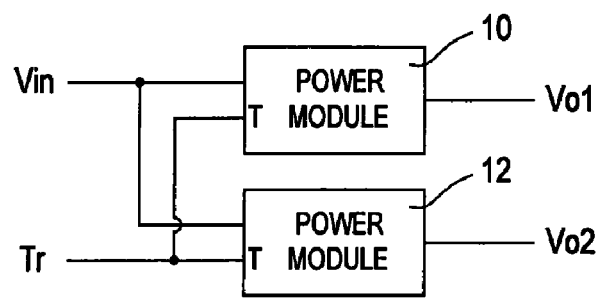

This invention relates to DC power supply modules, such as DC-DC converters and voltage regulators. DC-DC converters are also referred to as DC, DC-DC, or switch mode regulators, converters, power supplies, POL (point-of-load) modules, etc.; the term "DC-DC converter" or "converter" is used herein to include all such terms. Voltage regulators operate in a linear mode to provide a regulated output voltage, and desirably have a low drop-out (LDO) voltage between input and output voltages of the regulator. The term "power supply module" is used herein to include both converters and voltage regulators.

BACKGROUND

It is frequently required to provide a plurality of different supply voltages for different parts of an electronic circuit. For example, one or more low voltage supplies of the order of 1.8, 1.5, or 1.2 volts may be required for high-speed ICs (integrated circuits) and one or more higher voltage supplies of the order of 2.5, 3.3, or 5 volts may be required for input-output functions. In order to provide the different supply voltages, for example on a printed circuit board (PCB) on which the electronic circuit may be implemented, it is known to provide a plurality of DC point-of-load (POL) or power supply modules on the PCB. For efficient operation and relatively low power dissipation, the DC power supply modules typically comprise switch mode DC-DC converters, but they may alternatively comprise linear voltage regulators, or a mix of converters and regulators.

The supply voltages produced by the power supply modules are typically required to track one another in a predetermined manner. For example, on power-up, simultaneous, ratiometric, or offset tracking may be desired for each power supply module until its output voltage reaches its respective set-point. Converse supply voltage tracking may be required for power-down.

It is known to provide relatively complex arrangements that can control DC power supply sequencing and can perform other power management functions such as monitoring. Such arrangements may be more sophisticated and expensive, and may require more connections, than desired in many applications of DC power supply modules, and also may require undesired programming for their operation.

It is also known to provide a DC power supply module with a control pin referred to as a track pin. In this case, the output voltage of the DC power supply module is limited to the lesser of the set-point of the power supply and a control voltage supplied to the track pin. The track pins of a plurality of such power supply modules can be connected together and supplied with a suitable control voltage to facilitate tracking of the different output voltages produced by the power supply modules during power-up and/or power-down. For example, the control voltage can be provided by a supervisory IC, by the output voltage of another power supply, or by an internal or external resistor-capacitor (RC) circuit.

However, such an arrangement does not provide for tracking of the output voltages produced by the DC power supply modules in the event of fault conditions. For example, in the event of a fault causing an output voltage of one power supply module to decrease rapidly to zero, this known track pin arrangement does not similarly reduce the output voltage of each other power supply module. In addition, the known arrangement does not ensure that all of the power supply modules start operating at substantially the same threshold level of input voltage.

Accordingly, there is a need for an improved method and apparatus which can provide for tracking of DC power supply module output voltages under power-up and power-down conditions and can also accommodate fault conditions.

SUMMARY OF THE INVENTION

One aspect of this invention provides a method of communicating a fault state between power supply modules each arranged to limit an output voltage of the module in dependence upon a voltage at a track pin of the module, whereby tracking of the output voltages is facilitated by interconnecting the track pins of the modules, comprising the steps of: in at least one of the modules, changing a voltage of the track pin in response to a fault state; and in at least another of the modules, detecting a changed voltage of the track pin to detect the fault state.

Thus an interconnection of the track pins of different power supply modules provides not only for tracking of the output voltages of the modules, but also for communicating a fault state detected in one module to each other module.

Preferably the step of changing a voltage of the track pin in response to a fault state comprises reducing the voltage of the track pin to below a threshold voltage, and the step of detecting a changed voltage of the track pin to detect the fault state comprises detecting a voltage of the track pin below the threshold voltage.

The method preferably also includes the step of, in at least one of the modules, holding the voltage of the track pin below the threshold voltage during an initialization process of the module.

The method can further include the step of providing an initial voltage of the track pins of the modules greater than the threshold voltage. A voltage offset can be provided to compensate for the initial voltage of the track pins, and the voltage offset can be controllable to facilitate offset voltage tracking of the output voltages of the modules. A stage having a controllable gain can also be provided to facilitate ratiometric tracking of the output voltages of the modules.

Another aspect of the invention provides a power supply module for producing a controlled output voltage from an input voltage, comprising: a track pin, the module being responsive to a voltage of the track pin to limit the output voltage of the module; and a circuit responsive to a fault state for changing the voltage of the track pin.

The module preferably includes a circuit responsive to changed voltage of the track pin for detecting a fault state communicated to the module from another similar power supply module via interconnected track pins of the modules.

The circuit responsive to a fault state for changing the voltage of the track pin conveniently comprises a circuit for reducing the voltage of the track pin to below a threshold voltage. This circuit can also be arranged to hold the voltage of the track pin below the threshold voltage during an initialization process of the module.

A further aspect of the invention provides a power supply module for producing a controlled output voltage from an input voltage, comprising: a track pin, the module being responsive to a voltage of the track pin to limit the output voltage of the module; a circuit for reducing the voltage of the track pin to below a threshold voltage during an initialization process of the module or in response to a fault state; and a circuit responsive to a voltage of the track pin below the threshold voltage to maintain at or reduce to substantially zero the output voltage of the module.

The invention also extends to a power supply arrangement comprising a plurality of power supply modules each as recited above and having their track pins interconnected for output voltage tracking of the modules and for communication of fault states among the modules.

BRIEF DESCRIPTIONS OF THE DRAWINGS

Figure 2:
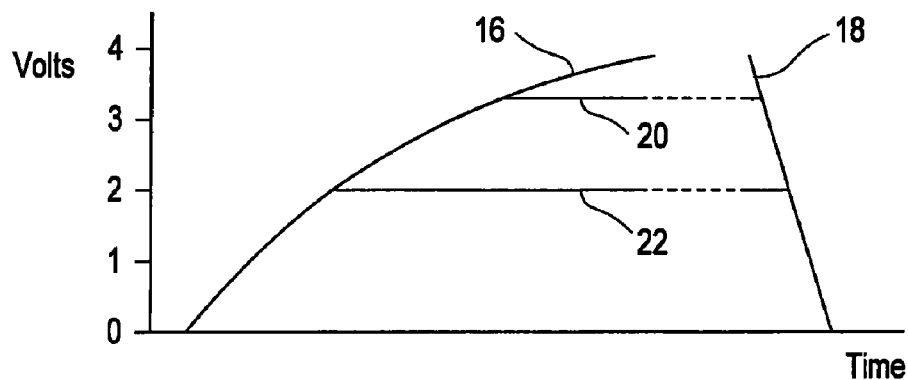
Figure 3:
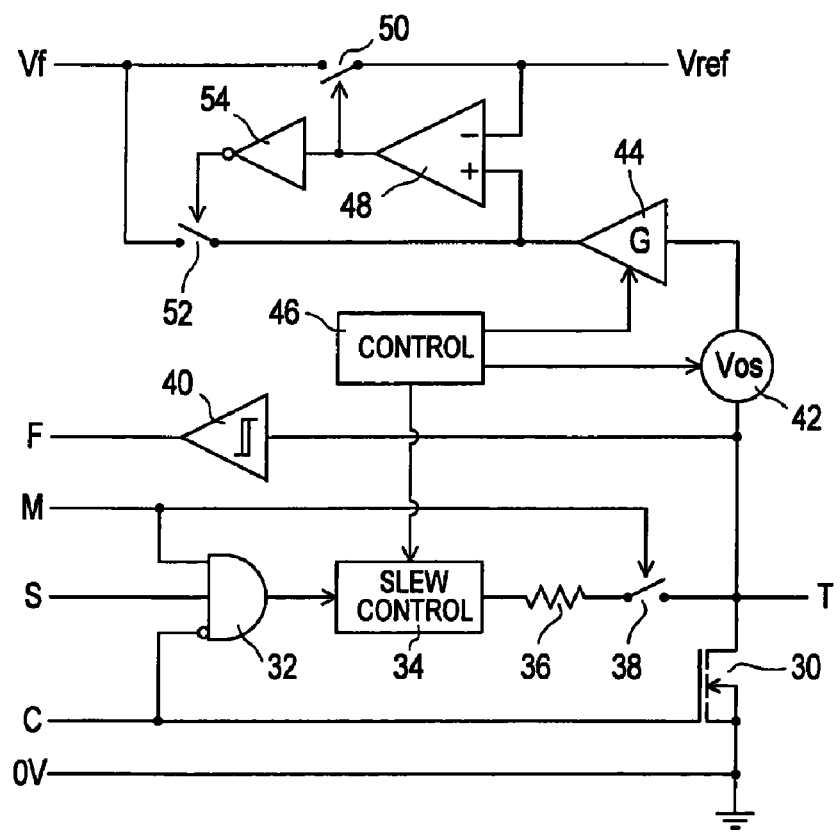
Figure 4:
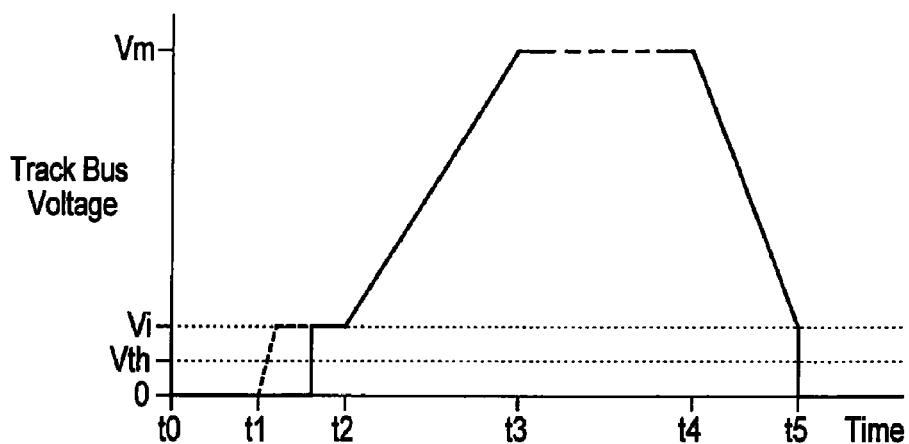
Figure 5:
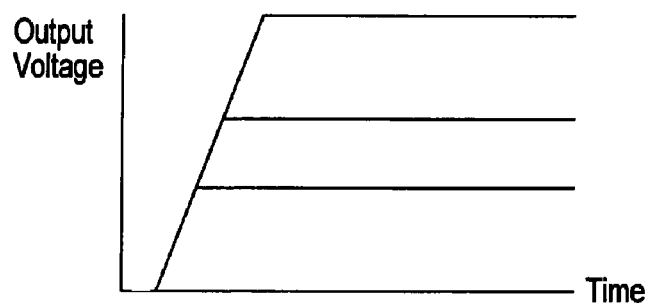
Figure 6:
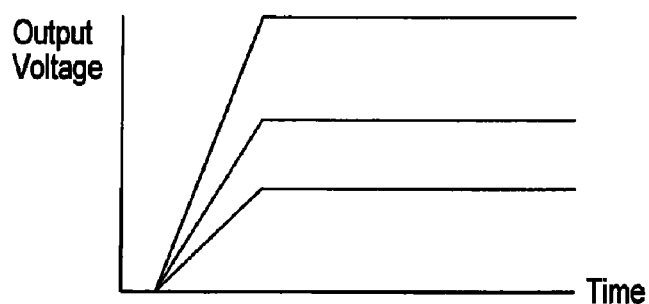
Figure 7:
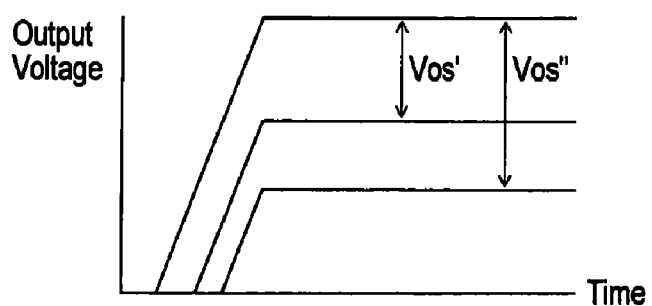

The invention will be further understood from the following description by way of example with reference to the accompanying drawings, in which the same references are used in different figures to denote similar elements and in which:

FIG. 1 schematically illustrates a known arrangement of tracking power supply modules;

FIG. 2 is a graph illustrating output voltage tracking for the power supply modules of FIG. 1;

FIG. 3 schematically illustrates a circuit arrangement forming part of a power supply module providing tracking and fault detection in accordance with an embodiment of this invention;

FIG. 4 is a graph illustrating operation of the circuit arrangement of FIG. 3; and FIGS. 5 to 7 are graphs illustrating alternative forms of output voltage tracking for power supply modules including the circuit arrangement of FIG. 3.

DETAILED DESCRIPTION

Referring to the drawings, FIG. 1 illustrates a known arrangement of tracking power supply modules, showing two power supply modules 10 and 12 which serve to produce respective output voltages Vo1 and Vo2 from an input voltage Vin which is the same for the two modules. Each of the power supply modules also has a track pin T, the track pins being connected together and to a track pin input Tr.

For simplicity, FIG. 1 does not illustrate other parts of the arrangement, such as a common ground or zero volt line and components required for voltage smoothing, determining a set-point or nominal value for the output voltage of each power supply module, margining, etc., these being known in the art and being described by various references, examples of which are:

"New Power Modules Include Supply Voltage Sequencing" by Chris Thornton, Sep. 8, 2004 (www.planetanalog.com, article ID 50900206);

"Power Supply Sequencing—A New Approach" by Mark O'Sullivan, Artesyn Technologies, ECN, Nov. 1, 2004;

Texas Instruments Document PTB78520W, "20-A, 18-60-V Input Auto-Track Compatible Isolated DC/DC Converter", SLTS226, July 2004;

Astec Document ATH15T05 Series—5-V Input, "15-A, 5-V Input Non-Isolated Wide-Output Adjust Power Module", Dec. 3, 2003.

"Auto-Track" is identified in some of the above references as a trademark of Texas Instruments, Inc. FIG. 2-1 of the Texas Instruments reference above is a block diagram illustrating Auto-Track features, including an R-C (resistor-capacitor) time constant circuit as discussed below.

As will be understood by those of ordinary skill in the art, for example from the above references, each of the power supply modules 10 and 12 operates so that its output voltage is limited to the lesser of the set-point of the power supply module and the voltage of its track pin T. Accordingly, each of the power supply modules 10 and 12 having its track pin T connected to the input Tr (and any other similar and similarly-connected power supply modules, not shown) limits its respective output voltage to the voltage at the input Tr. The voltage at the track input Tr can be determined in a desired manner, for example by an R-C circuit as described in the above references. Thus there is a simultaneous tracking of the output voltages of the power supply modules with the voltage at the track input Tr until their respective set-points are reached.

By way of example, FIG. 2 is a graph illustrating the output voltages Vo1 and Vo2 of the power supply modules 10 and 12 respectively of FIG. 1, assuming that the set-points of the power supply modules 10 and 12 are 3.3V and 2.0V respectively. For example, the input voltage Vin may be 5V.

Referring to FIG. 2, it is assumed that the voltage at the track input Tr is controlled, for example by an R-C circuit, on power-up to ramp up or increase from zero volts as shown by a line 16, and for subsequent power-down to ramp down or decrease as shown by a line 18. The output voltage Vo1 of the power supply module 10 tracks the lines 16 and 18, and is additionally limited to the set-point of 3.3V for this power supply module 10 as shown by a line 20. Similarly, the output voltage Vo2 of the power supply module 12 tracks the lines 16 and 18, and is additionally limited to the set-point of 2.0V for this power supply module 12 as shown by a line 22. Consequently, during power-up and power-down the output voltages Vo1 and Vo2 simultaneously track the voltage at the track input Tr, and hence one another.

As explained for example in the Astec reference above, this arrangement has an important constraint in that a valid input voltage Vin must be maintained until the power down is complete. It also requires that the track pin control voltage not fall faster than a slew rate capability of 5V/ms of the power supply modules.

In addition, the known arrangement of FIG. 1 has no provision for fault situations or for sequenced fault shutdown of the power supply modules. For example, in the event of a short circuit at the output of the power supply module 10 in FIG. 1, the output voltage Vo1 falls rapidly to zero, while the output voltage Vo2 of the power supply module 12 can be maintained until the voltage at the track input Tr falls at the slower, slew-rate limited, rate of the R-C circuit.

Furthermore, the known arrangement of FIG. 1 does not provide for ensuring that the different power supply modules all start up at the same value of the input voltage Vin, which is typically monitored by each power supply module. For example if, as the input voltage Vin rises from zero volts on power-up of a power supply system including the arrangement of FIG. 1, due to tolerances the power supply module 10 starts up at a relatively high value of the input voltage Vin, then the power supply module 12 may already have started increasing its output voltage Vo2 so that these output voltages may no longer track one another.

FIG. 3 shows a circuit arrangement forming part of a power supply module providing tracking and fault detection in accordance with an embodiment of this invention. This circuit arrangement is only one example of many different ways in which the invention can be carried out. Other parts of the power supply module, which for simplicity and clarity are not shown in FIG. 3, can have any desired or known form. In particular, the power supply module can comprise either a switch mode DC-DC converter or a linear voltage regulator, as already discussed above.

Referring to FIG. 3, the circuit arrangement provides the power supply module with a track pin T. For tracking of the output voltages of a plurality of power supply modules, the track pins of all of the power supply modules are connected together. This interconnection is similar to that described above with reference to FIG. 1, except that the input Tr shown in FIG. 1 is omitted. The interconnection of the track pins in FIG. 3 is referred to below as the track bus, and as described below it provides additional functioning compared with the arrangement of FIG. 1.

In the circuit arrangement of FIG. 3, a MOSFET 30 has its drain-source path connected between the track pin T and a ground or zero volt (0V) line, and its gate controlled by a control signal C. The control signal C is also supplied to an inverting input of an AND gate 32, a second input of which is supplied with a start/stop signal S and a third input of which is supplied with a master/slave signal M. The signals C, S, and M are binary signals which are combined by the gate 32 to provide an input signal to a slew control circuit 34, an output of which is connected via a resistance 36 and a switch 38 to the track pin T. The switch 38 is controlled by the signal M.

The track pin T is also connected to an input of a threshold circuit 40, which provides a binary output signal F dependent upon whether or not the voltage at the track pin T is above a threshold voltage Vth. In addition, the track pin T is connected via a circuit 42, which provides a voltage offset Vos as described below, to an input of a gain stage 44 which provides a gain G which may be greater than, equal to, or less than 1 (the gain stage 44 can comprise an attenuator and/or a gain element).

In the circuit arrangement of FIG. 3, the gain G of the gain stage 44, the offset voltage Vos of the circuit 42, and characteristics of the slew control circuit 34 are variable and are controlled by a control circuit 46, which can for example be a digital control circuit which stores digital values for determining these variables. For example, the digital values can be supplied via a serial communications interface (not shown) to registers in the control circuit 46, or can be pre-programmed into the power supply module. Although for clarity it is not shown in FIG. 3, the control circuit 46 can also be part of circuitry of the power supply module that is responsive to the signal F and that can provide the signals M, S, and C.

An output voltage of the gain stage 44 is compared with a reference voltage Vref in a comparator 48, the compared voltages being supplied respectively to non-inverting (+) and inverting (−) inputs of the comparator 48. An output of the comparator 48 controls a switch 50 directly, and controls a complementary switch 52 via an inverter 54, to supply the lesser of the reference voltage Vref and the output voltage of the gain stage 44 as a feedback voltage Vf to an error amplifier (not shown) of the power supply module. The error amplifier operates in known manner to control the output voltage of the power supply module.

Operation of the circuit arrangement of FIG. 3, and of a plurality of power supply modules each including such a circuit arrangement and having their track pins interconnected via the track bus, is described below with additional reference to FIG. 4, which is a graph illustrating voltage of the track pins T and track bus over time.

For simplicity, the following description assumes that one of the plurality of power supply modules is designated and operates as a master by being supplied with the signal M=1 or high, in response to which its switch 38 is closed, and that each other (slave) power supply module has the signal M=0 or low so that its gate 32 is disabled and its switch 38 is open. Thus in this case in each power supply module except the master the components 32 to 38 have no effect and can be ignored (and can optionally be omitted). Alternatives to this master-slave relationship are described later below.

In this case, for example, only the power supply module that is designated as the master monitors the input voltage Vin that, as shown in FIG. 1, is commonly supplied to all of the power supply modules. This is convenient because it avoids different ones of the power supply modules reaching different conclusions, for example as to suitability of the input voltage Vin for start-up of the power supply module, due to variations within tolerance ranges for the power supply modules, which could otherwise result in incorrect tracking of the power supply module output voltages.

It is assumed that starting at a time t0 shown in FIG. 4 the input voltage Vin is supplied to the power supply modules. Each power supply module performs an initialization process during which it produces the signal C=1 so that its MOSFET 30 is enabled to hold its track pin T, and hence the track bus, low or substantially at zero volts. Consequently, in each power supply module the threshold circuit 40 produces the signal F=0, in response to which the respective power supply module maintains its respective output voltage at zero. At the end of its respective initialization process, in the absence of any fault, each power supply module produces the signal C=0 to turn off its MOSFET 30. As long as any of the power supply modules is not fully initialized or detects a fault, its MOSFET 30 is turned on to hold the track bus low, and the signal F=0 is produced in each power supply module.

At a time t1 in FIG. 4, after the master power supply module is initialized and for example following a time delay, the master power supply module produces a start signal S=1 which, with the signal C=0 and the signal M=1 for the master power supply module, produces a high output from the gate 32 to the slew control circuit 34. In response to this and as controlled by the control circuit 46, the slew control circuit 34 produces an output voltage that rises from zero to an initial voltage Vi which is greater than the threshold voltage Vth, and optionally maintains this voltage during a delay period until a time t2. For example, the initial voltage Vi may be about 0.5V. The output voltage of the slew control circuit 34, where it differs from the voltage of the track bus as is allowed by the presence of the resistance 36, is shown by a dashed line in FIG. 4.

Although the switch 38 in the master power supply module is closed by the signal M=1, as shown in FIG. 4 the voltage of the track bus does not immediately rise to the initial voltage Vi because it is assumed to be pulled low by the MOSFET 30 in one or more other power supply modules during their initialization processes. When the track bus is no longer pulled down by any power supply, i.e. at the end of all initialization processes and in the absence of any fault state, the track bus also rises to the initial value Vi as shown by a solid line in FIG. 4.

In each of the power supply modules, the threshold circuit 40 produces the signal F=1 when the voltage Vi of the track bus exceeds the threshold voltage Vth. After initialization and in the absence of any fault, each power supply module is therefore enabled so that its respective output voltage is determined by the voltage of the track bus, in accordance with any of a variety of tracking schemes as described further below. From the time t2, the slew control circuit 34 of the master power supply module ramps up its output voltage, and hence the voltage of the track bus, to reach a maximum voltage Vm at a time t3. The output voltage of the master power supply module, and the output voltage of each other power supply module, is determined in accordance with the selected tracking scheme, in dependence upon the voltage of the track bus, until the respective set-point is reached, the states of the switches 50 and 52 in the respective power supply module then being changed accordingly to maintain the respective output voltage at its set point.

For a normal power-down in the absence of any fault, for example at a time t4, the master power supply module supplies the signal S=0 to the gate 32, in response to which as also shown in FIG. 4 the slew control circuit 34 of the master power supply module controls its output voltage, and hence the voltage of the track bus, to fall at a desired rate until a time t5. At the time t5 the master power supply module produces the signal C=1 to turn on its MOSFET 30 thereby pulling the track bus to zero volts, so that the signal F=0 is again produced in each of the power supply modules as described above. The output voltages of the power supply modules again are determined by the voltage of the track bus during this normal power-down, in accordance with the selected tracking scheme.

In the event that, at any time, any of the power supply modules detects a fault, it produces the signal C=1 to turn on its MOSFET 30, thereby pulling the voltage of the track bus to zero. In the master power supply module the resistance 36, which may be constituted by a resistance of the switch 38 and/or an output impedance of the slew control circuit 34, avoids contention between the output of the circuit 34 and the track bus. In each power supply module the threshold circuit 40 consequently produces the signal F=0 to shut down the power supply module immediately so that its output voltage is reduced to zero. Thus in the event of a fault being detected by any of the power supply modules at any time in the operating sequence described above, all of the power supply modules are shut down.

Although as described above the voltage of the track bus is reduced to zero rapidly by the respective power supply module turning on its MOSFET 30 on detection of a fault, it can be appreciated that even in such a fault condition the MOSFET 30 can be controlled so that the voltage of the track bus falls at a desired rate, and that the tracking described below can continue during this fault shut-down of the power supply modules.

FIGS. 5 to 7 are graphs illustrating three forms of output voltage tracking for the power supply modules including the circuit arrangement of FIG. 3. More particularly, FIG. 5 illustrates simultaneous tracking, FIG. 6 illustrates ratiometric tracking, and FIG. 7 illustrates offset voltage tracking, for three power supply modules producing respective output voltages. Each graph shows the output voltages as a function of time during a power-up process.

For the simultaneous tracking of FIG. 5, in each of the three power supply modules the offset voltage Vos provided by the circuit 42 is set to be −Vi, so that when the track bus is at the initial voltage Vi, as shown in FIG. 4, the gain stage 44 is supplied with a zero voltage corresponding to a zero output voltage of the respective power supply module. The gain of the gain stage 44 in each power supply module is set according to a ratio Vsetm/Vref, where Vsetm is the set voltage of the master power supply module, which is conveniently selected to be that one of the interconnected power supply modules having the greatest set point or output voltage.

Consequently, as the voltage of the track bus is increased above the initial voltage Vi as shown in FIG. 4, the output voltages of all of the simultaneous tracking power supply modules interconnected via the track bus rise together at the same rate, until their respective set points are reached, as shown in FIG. 5.

For the ratiometric tracking of FIG. 6, in each of the three power supply modules the offset voltage Vos is set to −Vi, so that the output voltages of the power supply modules all rise together when the voltage of the track bus is increased above the initial voltage Vi, but the gain of the gain stage 44 in each power supply module is set according to a ratio Vset/Vref, where Vset is the set voltage for the respective power supply module, so that the output voltages of all the power supply modules rise at different rates to reach their respective set points, as shown in FIG. 6.

For the offset tracking of FIG. 7, relative to the master (maximum set point) power supply module the other power supply modules have offset voltages of Vos' and Vos" as shown in FIG. 7, which are provided by increasing the (negative) magnitudes of the offset voltages Vos provided by the circuits 42 in the respective other power supply modules. Thus the offset voltages Vos provided by the circuits 42 in the power supply modules in this case are set to be −Vi for the master power supply module, and −Vi−Vos' and −Vi−Vos" for the other power supply modules, so that the output voltages of the power supply modules rise at the same rate to reach their respective set points from different starting times as shown in FIG. 7, corresponding to different voltages for the track bus above the initial voltage Vi as shown in FIG. 4.

It will be appreciated that the tracking schemes of FIGS. 5 to 7 are given only by way of example, and that the circuit arrangement of FIG. 3 facilitates the provision of these and other tracking schemes with suitable control of the offset voltage Vos produced by the circuit 42 and/or the gain G of the gain stage 44. For example, the tracking schemes of FIGS. 5 to 7 can be used in combination for different ones of the power supply modules, and/or individual power supply modules can follow different tracking schemes even though they are connected to the same track bus.

It can be appreciated that functions similar to those provided by the circuit arrangement of FIG. 3 can instead be provided in a number of other ways. For example, the track bus voltage and its ramps can be provided using digital control and a digital-to-analog converter, using controlled currents to charge and discharge a capacitor, or using one or more R-C circuits.

Although in the embodiment of the invention as described above one of the power supply modules interconnected via the track bus is designated as a master, and this is convenient for example for monitoring of the input voltage Vin as described above, this need not be the case. Instead, there may be no power supply module, or more than one power supply module, designated as a master, for example as described further below.

As one example, a power supply arrangement may include two power supply modules as described above each designated as a master, with these and other, slave, power supply modules having their track pins T connected to a track bus. When the switches of both master power supply modules are closed and the track bus is not pulled to zero volts by the MOSFET 30 of any of the power supply modules, the voltage of the track bus is an average (assuming equal resistances 36 in the modules) of the output voltages of the respective slew control circuits 34.

An example in which such an arrangement may be useful is a power supply arrangement having first (e.g. high-current) and second power supply module with a common input voltage, an output of the second power supply module constituting an input voltage for several (e.g. low-current) further power supply modules having different output voltages, the first power supply module and the highest-voltage further power supply module each being designated as a master.

Alternatively, there may be no power supply module designated as a master. For example, the power supply modules can be arranged in a manner similar to that described above with reference to FIG. 1, using one or more R-C circuits internally or externally of the power supply modules to provide the track bus voltage effectively from whichever power supply module provides the highest output voltage, when the input conditions of all of the power supply modules are satisfied. Again in this case, each power supply module is arranged to pull down the track bus voltage to below the threshold voltage Vth in the event that it detects a fault, and to shut down in response to a voltage of the track bus below the threshold voltage Vth. This can be done for example using circuits similar to the MOSFET 30 and threshold circuit 40 as described above, or otherwise as may be desired.

Similarly, the particular logic arrangements and other circuitry described above with reference to FIG. 3 are given by way of example, and other circuit arrangements can be used to provide similar or corresponding functions. For example, the slew control can be provided externally of the power supply modules themselves, e.g. using an external current source charging or discharging a capacitor, and can be separate from any master/slave control of the power supply modules. Furthermore, all of the power supply modules can be slave modules as described above, with the master and slew control functions incorporated into a power management control unit, which can provide a power shutdown by pulling the track bus, and hence the track pins T of all of the power supply modules, below the threshold voltage Vth.

Although particular criteria and logic signals are referred to above for start-up of each power supply module, it can be appreciated that the power supply arrangement and/or its individual power supply modules may instead, or in addition, use other criteria such as an external input enable from a microprocessor, a seat input to ensure that a circuit card including the power supply arrangement is properly inserted into a card socket, and a key combination to ensure that such card is inserted into an appropriate socket.

However implemented, embodiments of the invention differ from the prior art in using the track bus not only to provide a voltage for tracking of the output voltages of a plurality of power supply modules, but also to provide for fault communicating among the power supply modules, so that a fault state detected by one power supply module can be effectively communicated to each other tracking power supply module which can respond accordingly. Preferably, as described above, the communication of a fault state is a pull-down of the track bus voltage, and the response to this is a shut-down of each responding power supply module, but other forms of fault communication and response are possible.

For example, it can be appreciated from the above description that the track bus voltage as shown in FIG. 4 is offset, relative to what it otherwise could be, by the initial voltage Vi which is above the threshold voltage Vth. The track bus voltage can instead be shifted negatively by the amount Vi relative to its position as shown in FIG. 4, with a fault state being communicated as a small negative voltage (of magnitude beyond a threshold) on the track bus. This may facilitate providing a mixture of power supply modules known in the art, and power supply modules in accordance with embodiments of this invention providing fault state communication, connected to the same track bus.

Thus although particular embodiments of the invention have been described above in detail, it can be appreciated that these and numerous other modifications, variations, and adaptations may be made without departing from the scope of the invention as defined in the claims.

The invention claimed is:

1. A method of operating a plurality of power supply modules, each power supply module comprising a respective track pin interconnected with the respective track pin of each other power supply module, the method comprising:

limiting a respective output voltage of each power supply module to a lesser of a set-point voltage of the power supply module and a voltage of the respective track pin of the power supply module;

changing a voltage of the respective track pin of a power supply module in response to a fault state of the power supply module;

controlling a slew rate of the changed voltage of the respective track pin of the power supply module with a slew control circuit included in the power supply module coupled to the respective track pin of the power supply module;

providing a binary output signal from a threshold circuit included in each power supply module in response to the changed voltage of the respective track pin of the power supply module to indicate the fault state of the power supply module; and detecting the changed voltage at the respective track pin of each of at least one other power supply module to detect the fault state.

2. A method as claimed in claim 1 wherein the step of changing a voltage comprises reducing the voltage of the respective track pin to below a threshold voltage, and the step of detecting the changed voltage comprises detecting a voltage at the respective track pin of each of the at least one other power supply module below the threshold voltage.

3. A method as claimed in claim 2 and including the step of providing an initial voltage of the track pins of the power supply modules greater than the threshold voltage.

4. A method as claimed in claim 3 and including the step of holding the voltage of the respective track pin of at least one of the power supply modules below the threshold voltage during an initialization process.

5. A method as claimed in claim 3 and including the step of providing a voltage offset to compensate for the initial voltage of the track pins.

6. A method as claimed in claim 5 wherein the voltage offset is controllable to facilitate offset voltage tracking of the output voltages of the power supply modules.

7. A method as claimed in claim 1 and including the step of providing in at least one of the power supply modules a stage having a controllable gain to facilitate ratiometric tracking of the output voltages of the power supply modules.

8. An apparatus comprising:

a track pin;

a power supply module coupled to the track pin to limit an output voltage of the power supply module to a lesser of a set-point voltage of the power supply module and a voltage of the track pin;

a circuit coupled to the track pin to change the voltage of the track pin responsive to a fault state of the power supply module;

a slew control circuit included in the power supply module coupled to the track pin to control a slew rate of the changed voltage of the track pin; and a threshold circuit included in the power supply module coupled to the track pin to provide a binary output in response to the changed voltage of the track pin to indicate the fault state of the power supply module.

9. An apparatus as claimed in claim 8 and including a circuit responsive to changed voltage of the track pin for detecting a fault state communicated to the power supply module from another similar power supply module via interconnected track pins of the power supply modules.

10. An apparatus as claimed in claim 8 wherein the circuit responsive to a fault state comprises a circuit for reducing the voltage of the track pin to below a threshold voltage.

11. An apparatus as claimed in claim 10 and including a circuit responsive to a voltage of the track pin below the threshold voltage to detect a fault state communicated to the power supply module via the track pin.

12. An apparatus as claimed in claim 10 and including a circuit for providing an initial voltage of the track pin greater than the threshold voltage.

13. An apparatus as claimed in claim 12 wherein the circuit for reducing the voltage of the track pin to below a threshold voltage is also arranged to hold the voltage of the track pin below the threshold voltage during an initialization process of the power supply module.

14. An apparatus as claimed in claim 12 and including a circuit for providing a voltage offset to compensate for the initial voltage of the track pin.

15. An apparatus as claimed in claim 14 and including a control arrangement for controlling the voltage offset.

16. An apparatus as claimed in claim 15 and including a controllable gain stage controlled by the control arrangement.

17. A power supply arrangement comprising a plurality of apparatus each as claimed in claim 9 and having their track pins interconnected for output voltage tracking of the power supply modules and for communication of fault states among the power supply modules.

18. An apparatus comprising:

a track pin;

a power supply module coupled to the track pin to limit an output voltage of the power supply module to a lesser of a set-point voltage of the power supply module and a voltage of the track pin;

a circuit coupled to the track pin to reduce the voltage of the track pin to below a threshold voltage in response to a fault state of the power supply module;

a slew control circuit included in the power supply module coupled to the track pin to control a slew rate of the changed voltage of the track pin; and a threshold circuit included in the power supply module coupled to the track pin to provide a binary output in response to the reduced voltage of the track pin to indicate the fault state of the power supply module; and a circuit coupled to the track pin to maintain the output voltage of the power supply module at substantially zero or reduce the output voltage of the power supply module to substantially zero responsive to a voltage of the track pin being below the threshold voltage.

19. An apparatus as claimed in claim 18 and including a circuit for providing a voltage offset to compensate for an initial voltage of the track pin above the threshold voltage.

20. A power supply arrangement comprising a plurality of apparatus each as claimed in claim 18 and having their track pins interconnected for output voltage tracking of the power supply modules and for communication of fault states among the power supply modules.

\* \* \* \* \*